April 15, 1952 G. N. RISTINE 2,592,741
FISHING LINE SPREADER
Filed May 22, 1950
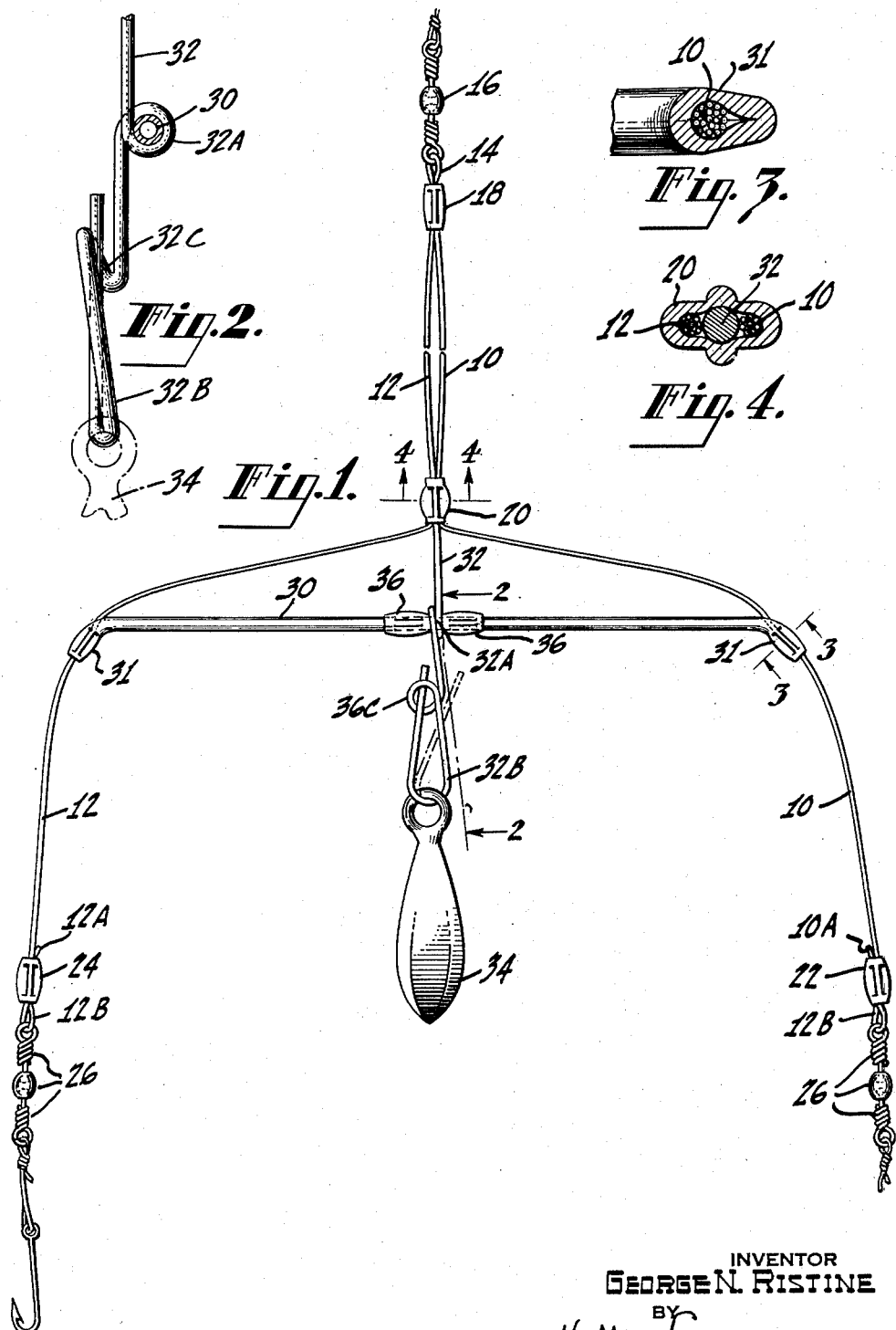
INVENTOR
George N. Ristine
BY
Harry Langsam
ATTORNEY Patented Apr. 15, 1952

2,592,741

UNITED STATES PATENT OFFICE 2,592,741

FISHING LINE SPREADER

George N. Ristine, Philadelphia, Pa.

Application May 22, 1950, Serial No. 163,503

2 Claims. (Cl. 43—42.74)

My invention relates to a spreader for fishhooks and particularly to a spreader used in conjunction with two hooks and a sinker.

Heretofore, fishhooks have been held on a spring wire or gut and where two hooks have been used they have been held apart by a spreader. The purpose of the spreader is to prevent entanglement of the hooks with one another. In the prior art one end of the line contained a fishhook and the other end of the line contained a sinker. However, to my knowledge, there has never been a fishing leader or spreader wherein both lines are provided with a hook with a detachable sinker therebetween for properly balancing the said hooks.

It, therefore, is an object of my invention to provide a fishing line spreader wherein both lines are provided with a hook and a detachable sinker positioned therebetween, as it is well-known that a balanced, symmetrical leader is of advantage to the art of fishing.

Another object of my invention is to provide a balanced symmetrical leader with provision for easily attaching and detaching a sinker therefrom.

Another object of my invention is to provide a spreader wherein the fishhooks on the end of the line will not interfere with each other or with the sinker therebetween.

Other objects of my invention are to provide an improved fishing line spreader that is easily and economically produced, which is sturdy in construction, and which is highly effective in use.

With the above and related objects in view, my invention consists in the details of construction and combination of parts, as will be more fully understood from the following description, when read in conjunction with the accompanying drawing, in which:

Fig. 1 is a side elevational view of a leader embodying my invention.

Fig. 2 is a fragmentary side view of the sinker attachment device and spreader bar.

Fig. 3 is a cross-sectional view taken along the line 3—3 of Fig. 1.

Fig. 4 is a cross-sectional view taken along the line 4—4 of Fig. 1.

Referring now in greater detail to my invention I show in Fig. 1 a leader comprising a pair of diverging strands 10, 12 of gut preferably formed from a one-piece element of gut doubled over at a point whereby they diverge forming two individual substantially parallel strands at the lower end and a loop 14 for attachment to a swivel 16 at the upper end.

The folded back portions 10, 12 of the leader are clamped together by metal sleeves 18, 20 one of which forms the upper loop 14 and the other fixes the point from where the strands 10, 12 diverge. The free ends 10A, 12A of the diverging strands 10, 12 are folded back and fastened by sleeves 22, 24 to provide loops 10B and 12B at the lower ends of the leader to provide for attachment of a swivel and hook assembly to each, designated as 26.

A spreader bar 30 is provided to keep the divergent strands 10, 12 apart and in a symmetrical relation to each other. This is accomplished by placing the spreader bar 30 in a horizontal position with its mid-point directly under the metal sleeve 20 where the strands diverge so that the spreader is arranged in triangular relationship with the diverging strands 10, 12. The spreader bar 30 is solid with its downturned ends formed into sleeves 31. The sleeves 31 are turned directly downward and one sleeve 31 is fixedly clamped to a portion of the strand 10, while the other sleeve 31 is fixedly clamped to a portion of the strand 12.

The strand of wire 32 is clamped within the sleeve 20, along with the strands 10, 12, at the apex of the triangle formed by the said strands and the spreader bar 30.

The wire 32 passes downwardly and around the spreader bar 30 forming a loop 32A which helps to support the spreader bar but whose chief function is to keep the sinker 34 centrally positioned with respect to the hooks on the divergent strands 10, 12. The loop 32A is held centrally positioned on the spreader bar 30 by means of the sleeves 36 clamped on each side of the loop 32A. The wire 32 is also provided with a hook 32B for supporting the sinker 34. A partially open loop 32C is formed in the wire 32 at a point adjacent the free end of the hook 32B. The partially open loop 32C is utilized to lock the end of the hook 32B so the sinker 34 cannot slip off. The free end of the hook 32B rests between the two sides of the loop 32C when the hook is locked. To open the hook 32B the free end of the hook must be pressed until it is outside the loop 32C, at which time it is moved slightly to one side and released, somewhat in the manner of a safety pin.

Although my invention has been described in considerable detail, such description is intended as merely illustrative rather than limiting, as my invention may be variously embodied, and the scope of the invention is to be determined as claimed.

I claim as my invention:

1. A fishing leader comprising a one-piece element doubled over for a predetermined distance, a clamping sleeve clamped over a portion of said one-piece element to form a loop adjacent the doubled over portion of said one-piece element, a piece of wire, a second clamping sleeve spaced from said first sleeve holding said doubled over portion of said element to provide strands in parallelism and said piece of wire, said wire having a closed loop at a predetermined distance from said clamping sleeve and a partially open loop at a distance from said closed loop and a hook at the end of said wire whose free end is adjacent said partially open loop; a spreader bar passing through said closed loop, the ends of said spreader bar being formed into downwardly turned clamps clamped on different portions of said one-piece element, and a pair of metal sleeves fixedly clamped on said spreader bar on each side of said closed loop to hold said spreader bar in fixed relationship with said wire.

2. A fishing leader comprising a one-piece element doubled over for a predetermined distance whereafter the strands of said one-piece element diverge, a plurality of clamping sleeves, one of said clamping sleeves being located adjacent the point of doubling over of said one-piece element to form a loop in the doubled over portion of said one-piece element, a second of said clamping sleeves being located adjacent the point where said strands diverge to hold said doubled over portion of said one-piece element to provide strands in parallelism, and a pair of said clamping sleeves each being clamped over a different doubled over end of a diverging strand to form a loop at the end of each of said diverging strands, a wire held by said second clamping sleeve, said wire being formed with a closed loop at a predetermined distance from said second clamping sleeve and a partially open loop at a distance from said first closed loop, one end of said wire defining a hook whose free end is adjacent said partially open loop, a spreader bar passing through said closed loop, the ends of said spreader bar being formed into downwardly turned clamps each of which is clamped on a portion of a different one of said diverging strands, and a pair of metal sleeves fixedly clamped on said spreader bar, said sleeves being located one on each side of said closed loop to hold said spreader bar in fixed relationship with said wire.

GEORGE N. RISTINE.

REFERENCES CITED

The following references are of record in the file of this patent:

UNITED STATES PATENTS

| Number | Name | Date |
| --- | --- | --- |
| 2,492,638 | Hickson | Dec. 27, 1949 |